United States Patent
Yasuda et al.

(10) Patent No.: US 10,117,088 B2
(45) Date of Patent: Oct. 30, 2018

(54) CONNECTION CONTROL METHOD BY COMMUNICATION TERMINAL

(71) Applicant: NEC Corporation, Tokyo (JP)

(72) Inventors: Masato Yasuda, Tokyo (JP); Norihito Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 164 days.

(21) Appl. No.: 15/105,975

(22) PCT Filed: Dec. 5, 2014

(86) PCT No.: PCT/JP2014/006088
§ 371 (c)(1),
(2) Date: Jun. 17, 2016

(87) PCT Pub. No.: WO2015/098003
PCT Pub. Date: Jul. 2, 2015

(65) Prior Publication Data
US 2017/0034684 A1    Feb. 2, 2017

(30) Foreign Application Priority Data
Dec. 26, 2013    (JP) .................................. 2013-268597

(51) Int. Cl.
*H04L 12/50*    (2006.01)
*H04W 8/00*    (2009.01)
(Continued)

(52) U.S. Cl.
CPC ........... *H04W 8/005* (2013.01); *H04W 76/10* (2018.02); *H04W 84/12* (2013.01); *H04W 84/18* (2013.01)

(58) Field of Classification Search
CPC ....................................................... H04L 12/50
(Continued)

(56) References Cited

U.S. PATENT DOCUMENTS

| 9,591,582 | B1* | 3/2017 | Rabii .................. H04W 52/028 |
| 2010/0272083 | A1 | 10/2010 | Itoh et al. |
| 2011/0149816 | A1 | 6/2011 | Saito et al. |

FOREIGN PATENT DOCUMENTS

| JP | 2010-258619 A | 11/2010 |
| JP | 2011-135166 A | 7/2011 |
| JP | 2013-176045 A | 9/2013 |

OTHER PUBLICATIONS

International Search Report corresponding to PCT/JP2014/006088 dated Feb. 24, 2015 (one page).
(Continued)

*Primary Examiner* — Dang Ton
(74) *Attorney, Agent, or Firm* — Wilmer Cutler Pickering Hale and Dorr LLP

(57) ABSTRACT

A communication terminal has a wireless communication part and a control part. The control part sequentially switches a plurality of communication channels and discovers another communication terminal existing around the communication terminal itself. In the case of connecting to the other communication terminal found in the discovery, the control part determines which of the communication terminals transmits a connection request. In a case where the communication terminal itself does not transmit a connection request, the control part stops the discovery process and waists for reception of a connection request from the other communication terminal by using a given communication channel.

23 Claims, 13 Drawing Sheets

(51) Int. Cl.
*H04W 76/10* (2018.01)
*H04W 84/12* (2009.01)
*H04W 84/18* (2009.01)

(58) Field of Classification Search
USPC .......................................................... 370/328
See application file for complete search history.

(56) References Cited

OTHER PUBLICATIONS

Wi-Fi Alliance Technical Committee P2P Task Group, Wi-Fi Peer-to-Peer (P2P) Technical Specification, Version 1.2, Wi-Fi Alliance, Dec. 14, 2011, p. 24-28 (159 Pages).

* cited by examiner

CONNECTION CONTROL METHOD BY COMMUNICATION TERMINAL

CROSS-REFERENCE TO RELATED APPLICATIONS

This application is a national stage application of International Application No. PCT/JP2014/006088 entitled "Connection Control Method By Communication Terminal" filed on Dec. 5, 2014, which claims priority to Japanese Application No. 2013-268597 filed on Dec. 26, 2013, the disclosures of which are hereby incorporated by reference in their entirety.

TECHNICAL FIELD

The present invention relates to a connection control method by a communication terminal, a communication terminal, and a program.

BACKGROUND ART

As a type of short-distance communication network, a communication network conforming to the Wi-Fi Direct specification is known (see Patent Document 1 and Non-Patent Document 1, for example). This type of communication network has features such as one-to-many connection is available, communication between slaves can be established via a master and the strength of security is relatively high, when compared with a Wi-Fi Ad-hoc network. Thus, in recent years, a communication network conforming to the Wi-Fi Direct specification has been used for various purposes such as data sharing. The present invention relates to a connection control method by a communication terminal in this type of communication network. However, application of the present invention is not limited to only a communication network conforming to the Wi-Fi Direct specification.

In a communication network conforming to the Wi-Fi Direct specification, a communication terminal which is not connected to the communication network exchanges communication messages relating to discovery with another communication terminal and thereby discovers the other communication terminal existing around the communication terminal itself. To be specific, the communication terminal executes a discovery process in which two states called a search state and a listen state are alternately repeated. In the search state, the communication terminal sequentially switches a plurality of communication channels, broadcasts a probe request on each of the communication channels, and receives a probe response to the probe request. On the other hand, in the listen state, the communication terminal selects any one of the plurality of communication channels as a communication channel called a listen channel, receives a probe request from another communication terminal through the listen channel, and transmits a probe response to the probe request. Transmission of a probe response can be performed in the listen state, but cannot be performed in the search state. The durations of the search state and the listen state are random, and the durations of use of the respective communication channels in the search state are also random.

The communication terminal receives a probe response to a probe request transmitted through a given communication channel in the search state, thereby recognizing the presence of another communication terminal around the communication terminal itself and also recognizing a listen channel used by the other communication terminal. On the other hand, the other communication terminal receives a probe request in the listen state, thereby recognizing the presence of another communication terminal around the other communication terminal itself and returning a probe response. Because a probe request contains information of a listen channel used by a communication terminal transmitting the probe request, a communication terminal receiving the probe request can analyze the probe request and thereby know the listen channel used by the transmitter communication terminal.

In the communication network conforming to the Wi-Fi Direct specification, the communication terminal still continues the discovery process after finding the other communication terminal in the discovery process. When connection to the other communication terminal found is instructed by the user or the like, the communication terminal stops the discovery process and transmits a connection request to the other communication terminal by using the listen channel of the other communication terminal. Upon receiving the connection request through the listen channel, the other communication terminal returns a response to the connection request. In this way, a connection process between the communication terminals is initiated.

Patent Document 1: Japanese Unexamined Patent Application Publication No. JP-A 2013-176045
Non-Patent Document 1: Wi-Fi Alliance Technical Committee P2P Task Group Wi-Fi Peer-to-Peer (P2P) Technical Specification Version 1.1

However, in a case where one communication terminal transmits a connection request to another communication terminal by using the listen channel of the other communication terminal in a situation that a plurality of communication terminals adjacent to each other are executing the discovery process, respectively, there is no guarantee that the connection request is received by the other communication terminal. This is because the other communication terminal is also executing the discovery process and alternately repeating the search state and the listen state and hence there is no guarantee that the other communication terminal is in the listen state at a moment when the connection request is transmitted. Therefore, when the other communication terminal is not in the listen state but in the search state, the connection request is not received by the other communication terminal and therefore a response to the connection request is not returned. Then, the communication terminal transmitting the connection request retransmits the connection request until a response returns or a timeout occurs. Because the search state and the listen state are switched at random intervals as mentioned before, the connection request is eventually transmitted during a period when the other terminal is in the listen state. However, it is a problem that it takes time before that. This problem could generally occur in a communication network in which a communication terminal discovers another communication terminal existing around the communication terminal itself by sequentially switching a plurality of communication channels, not limited in a communication network conforming to the Wi-Fi Direct specification.

SUMMARY

An object of the present invention is to provide a connection control method by a communication terminal that solves the abovementioned problem, that is, a problem that it takes long time before a connection request is transmitted to and received by another communication terminal found in the discovery process, and consequently, initiation of the connection process delays.

A connection control method by a communication terminal according to a first aspect of the present invention is a connection control method executed by a communication terminal, and the connection control method includes:

executing a discovery process including sequentially switching a plurality of communication channels and discovering another communication terminal existing around the communication terminal itself;

in a case of connecting to another communication terminal found in the discovery process, performing determination which of the communication terminals transmits a connection request; and in a case where the communication terminal itself does not transmit the connection request, stopping the discovery process and waiting for reception of the connection request from the other communication terminal by using a given communication channel.

A communication terminal according to a second aspect of the present invention is a communication terminal configuring a communication network, and the communication terminal includes:

a wireless communication part using a plurality of communication channels and exchanging communication messages with another communication terminal; and a control part connected to the wireless communication part.

The control part: executes a discovery process including sequentially switching a plurality of communication channels and discovering another communication terminal existing around the communication terminal itself; in a case of connecting to another communication terminal found in the discovery process, performs determination which of the communication terminals transmits a connection request; and in a case where the communication terminal itself does not transmit the connection request, stops the discovery process and waits for reception of the connection request from the other communication terminal by using a given communication channel.

A program according to a third aspect of the present invention includes instructions for causing a computer configuring a communication network to function as:

a wireless communication part using a plurality of communication channels and exchanging communication messages with another communication terminal; and a control part connected to the wireless communication part.

The control part: executes a discovery process including sequentially switching a plurality of communication channels and discovering another communication terminal existing around the communication terminal itself; in a case of connecting to another communication terminal found in the discovery process, performs determination which of the communication terminals transmits a connection request; and in a case where the communication terminal itself does not transmit the connection request, stops the discovery process and waits for reception of the connection request from the other communication terminal by using a given communication channel.

Because the present invention has the configurations described above, a connection request can be quickly transmitted to and received by another communication terminal found in the discovery process, and consequently, it is possible to initiate the connection process early.

EXEMPLARY EMBODIMENTS

Next, exemplary embodiments of the present invention will be described in detail referring to the attached drawings.

First Exemplary Embodiment

Figure 1:
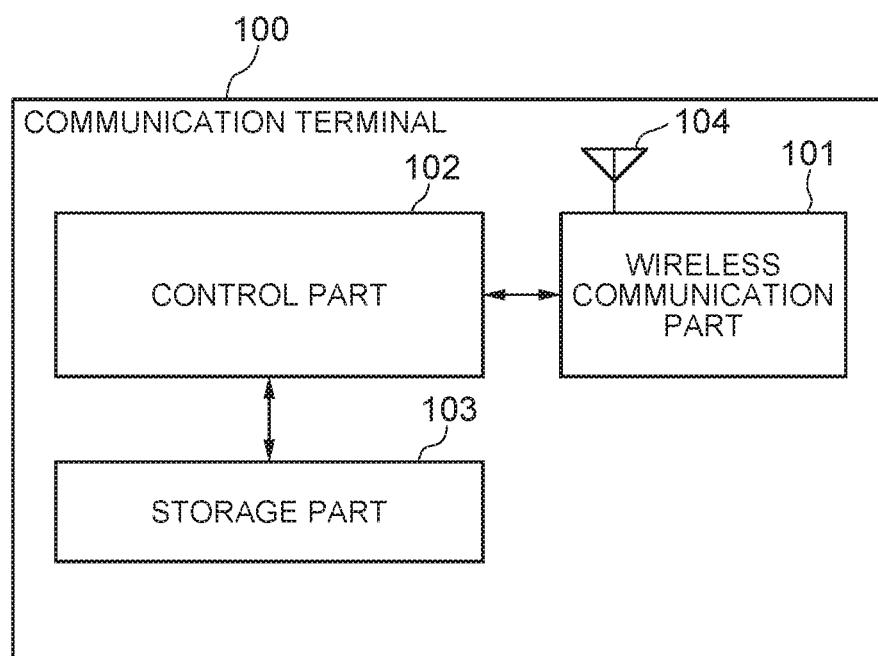
FIG. 1 is a block diagram of a communication terminal according to a first exemplary embodiment of the present invention.

Referring to FIG. 1, a communication terminal 100 according to a first exemplary embodiment of the present invention is a wireless communication terminal which connects to another communication terminal and forms a communication network. The communication terminal 100 has a wireless communication part 101, a control part 102, a storage part 103 and an antenna 104.

The wireless communication part 101 has a function of exchanging communication messages with another communication terminal by radio. At the time of transmission, the wireless communication part 101 creates a packet of a communication message in accordance with a request from the control part 102, executes a process such as adding a header and an error detection code to the created packet, generates a modulation signal of a carrier wave frequency band from the processed data, and transmits the modulation signal as a radio signal from the antenna 104. On the other hand, at the time of reception, the wireless communication part 101 demodulates a radio signal received by the antenna 104, decodes a packet of a communication message, and gives the control part 102 a communication message after confirmation of the absence of an error on the basis of an error detection signal.

The control part 102 has a function of executing communication control on the entire communication terminal 100, such as determination of a frequency used by the wireless communication part 101 (that is, determination of a communication channel), instruction to create and transmit various kinds of communication messages, interpretation of various kinds of received communication messages and control of a connection process.

For example, the control part 102 has a function of, when the communication terminal 100 is not connected to the communication network, discovering another communication terminal existing around the communication terminal 100 by exchanging communication messages relating to the discovery with the other communication terminal existing around the communication terminal 100 through the wireless communication part 101. The process to discover a surrounding communication terminal is performed in conformity to the Device Discovery Procedures of the Wi-Fi Direct specification. To be specific, the control part 102 executes a discovery process in which two states called a search state and a listen state are alternately repeated.

In the search state, the control part 102 sequentially switches a plurality of communication terminals to broadcast a probe request on each of the communication channels and receive a probe response to the probe request. As the plurality of communication channels, three channels 1, 6, 11 are used in the 2.4 GHz band, for example. A probe request contains the MAC address of the communication terminal 100 transmitting the probe request, information of a listen channel, and so on. A probe response contains the MAC address and device name (P2P Device Name) of a communication terminal transmitting the probe response, and so on. On the other hand, in the listen state, the control part 102 uses any one of the plurality of communication channels as a listen channel to receive a probe request from another communication terminal through the listen channel and transmit a probe response to the probe request. A listen channel is chosen at the time point of initiation of the discovery process and kept until the discovery process ends. Transmission of a probe response can be performed in the listen state but cannot be performed in the search state. Further, the durations of the search state and the listen state are random, and the durations of use of the respective communication channels in the search state are also random.

Further, the control part 102 has a function of determining on the basis of information of another communication terminal found in the discovery process whether or not to connect the communication terminal 100 to the other communication terminal and, in the case of connecting, which of the communication terminals transmits a connection request.

In determination whether or not to connect the communication terminal 100 to another communication terminal, the control part 102 may determine whether or not to connect the communication terminal 100 to the other communication terminal on the basis of the MAC address of the other communication terminal. For example, the control part 102 may determine to connect when the value of the first N bits of 48 bits forming the MAC address of the other communication terminal is a given value, and may determine not to connect otherwise. Assuming N is 24, the control part 102 determines to connect only when the vender ID part of the MAC address is a given value. Assuming N is 32, the control part 102 determines to connect only when the vender ID part and model ID of the MAC address is a given value. However, N is not limited to 24 or 32. According to this method, by presetting a first N-bit value of the MAC address of the communication terminal 100 to a given value, it is possible to connect the communication terminal 100 to a communication terminal whose MAC address contains the same given value as the first N-bit value. Alternatively, by previously storing a list of MAC addresses of communication terminals to connect with the communication terminal 100 in the storage part 103, the control part 102 may determine to connect when the MAC address of the other communication terminal is included in the MAC address list, and may determine not to connect otherwise.

Further, in determination whether or not to connect the communication terminal 100 to another communication terminal, the control part 102 may determine whether or not to connect the communication terminal 100 to the other communication terminal on the basis of the device name of the other communication terminal. For example, by previously storing a list of the device names of communication terminals to connect with the communication terminal 100 in the storage part 103, the control part 102 may determine to connect when the device name of the other communication terminal is included in the list, and may determine not to connect otherwise.

On the other hand, in determination which of the communication terminals transmits a connection request in the case of connecting, the control part 102 may determine which of the communication terminals transmits a connection request on the basis of a magnitude relation between the value of the MAC address of the communication terminal 100 and the value of the MAC address of the other communication terminal. Because communication terminals do not have MAC addresses of equal value basically, according to the above method, one of two communication terminals attempting to connect to each other is determined as a transmitter and the other is determined as a receiver. However, the present invention is not limited to the method of determining a transmitter and a receiver on the basis of a magnitude relation between MAC address values. For example, on the basis of other information such as P2P Device Address or Device Name contained in a probe response, it may be determined which of the communication terminals transmits a connection request. As an example, the control part 102 may regard bit strings representing device names as numerical values, compare the numerical value of the device name of a communication terminal with the numerical value of the device name of the other communication terminal, and determine the communication terminal with a smaller value as a connection request transmitter.

Further, the control part 102 has a function of, in the case of connecting to the other communication terminal and not transmitting a connection request from the communication terminal 100 as a result of the above determination, stopping the discovery process and waiting for reception of a connection request from the other communication terminal by using a given communication channel. The given communication channel may be any communication channel as far as a connection request transmitter and a connection request receiver use the same communication channel. Alternatively, the given communication channel may be determined in accordance with a predetermined rule from among a plurality of communication channels. For example, a listen channel of a communication terminal serving as a connection request receiver may be used as the given communication channel. On the contrary, a listen channel of a communication terminal serving as a connection request transmitter may be used. In a case where the other communication terminal is not connected to the communication network as the communication terminal 100, the connection request which the control part 102 waits for receiving is GO Negotiation Request to determine which one of the communication terminals as a group owner serving as an access point. On the other hand, in a case where the other communication terminal is the group owner of a communication group, the connection request is Invitation Request to request for participation in the communication group. However, the present invention is not limited to such connection requests.

Furthermore, the control part 102 has a function of, in the case of connecting to the other communication terminal and transmitting a connection request from the communication terminal 100 as a result of the above determination, stopping the discovery process and transmitting a connection request to the other communication terminal by using the above-mentioned given communication channel. In a case where the other communication terminal is not connected to the communication network as the communication terminal 100, the connection request transmitted to the other communication terminal is GO Negotiation Request. However, the present invention is not limited to such a connection request.

The storage part 103 is configured with a storage device such as a ROM (Read Only Memory), a RAM (Random Access Memory) and a hard disk, and stores various kinds of data. The stored data are, for example, local communication terminal status information representing whether or not the communication terminal 100 is connected to the communication network, information of a group owner in a case where the communication terminal 100 is connected to the communication network, information received from another communication terminal discovered (the MAC address, terminal name and status information (another communication terminal status information representing whether or not to be able to host an unconnected terminal which is not connected to the communication network, an already-connected master terminal and a persistent group) of the other communication terminal discovered), and so on.

Next, the operation of the communication terminal 100 according to this exemplary embodiment will be described.

Figure 2:
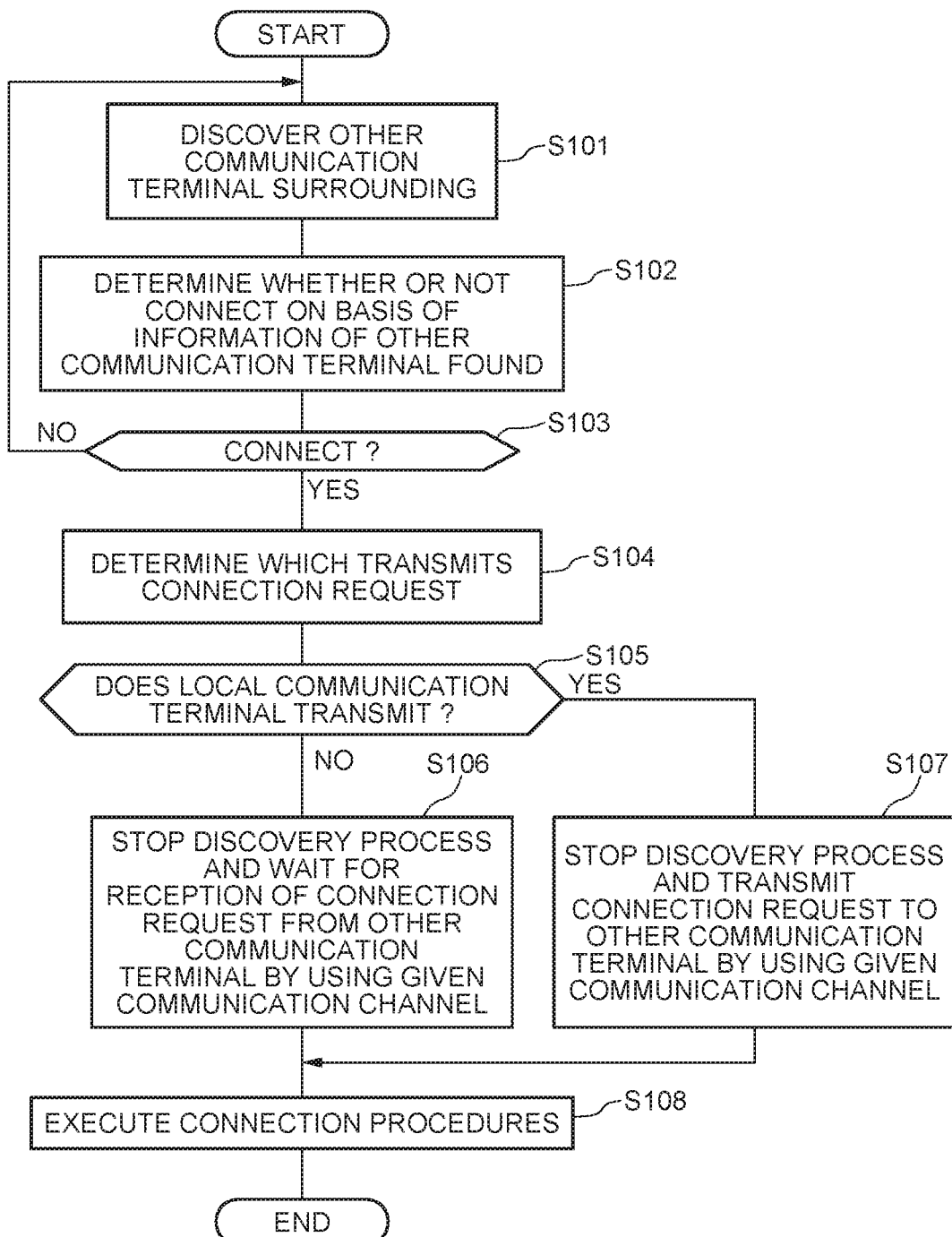
FIG. 2 is a flowchart showing an example of the operation of the communication terminal according to the first exemplary embodiment of the present invention.

Upon started, the control part 102 of the communication terminal 100 initiates execution of a process shown by FIG. 2. First, the control part 102 exchanges communication messages relating to discovery with another communication terminal existing around the communication terminal 100 through the wireless communication part 101, thereby discovering a surrounding communication terminal (step S101).

Figure 3:
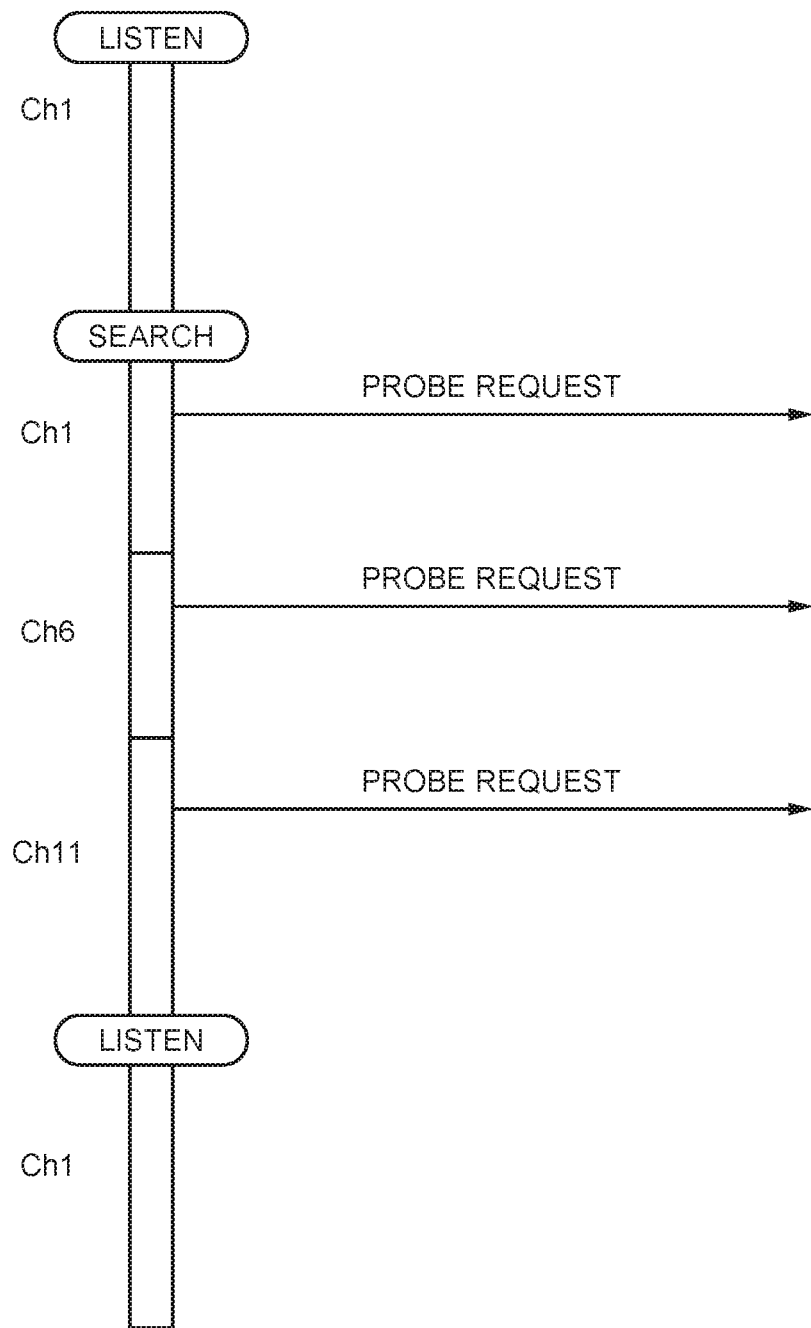
FIG. 3 is a conceptual diagram of a process to discover another communication terminal by the communication terminal according to the first exemplary embodiment of the present invention.

FIG. 3 is a conceptual diagram showing a process to discover another communication terminal. A discovery process of this example conforms to Device Discovery Procedure of the Wi-Fi Direct specification. In a listen state, the control part 102 selects a communication channel ch1 as a listen channel and receives a probe request transmitted from another communication terminal through the communication channel ch1. After remaining in the listen state for a random duration, the control part 102 transits to a search state, first selects the communication channel ch1 to transmit a probe request and receive a probe response transmitted from another communication terminal through the communication channel ch1. After continuing to use the communication channel ch1 for a random duration, the control part 102 next selects a communication channel ch6 to transmit a probe request and receive a probe response transmitted from another communication terminal through the communication channel ch6. After continuing to use the communication channel ch6 for a random duration, the control part 102 next selects a communication channel ch11 to transmit a probe request and receive a probe response transmitted from another communication terminal through the communication channel ch11. Then, after continuing to use the communication channel ch11 for a random duration, the control part 102 transmits to the listen state again to repeat the same operation as described above.

Figure 4:
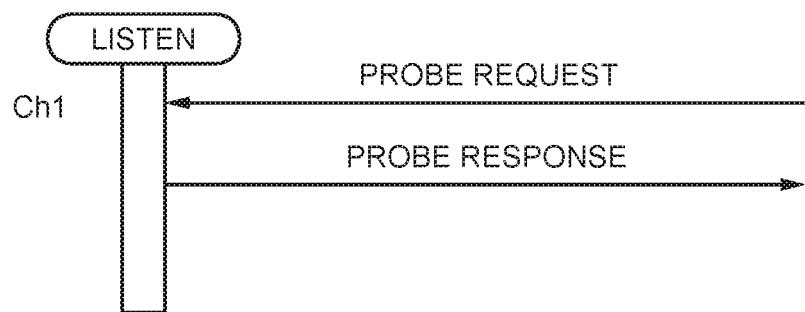
FIG. 4 is a conceptual diagram showing an example of a situation in which another communication terminal is found in the discovery process by the communication terminal according to the first exemplary embodiment of the present invention.
Figure 5:
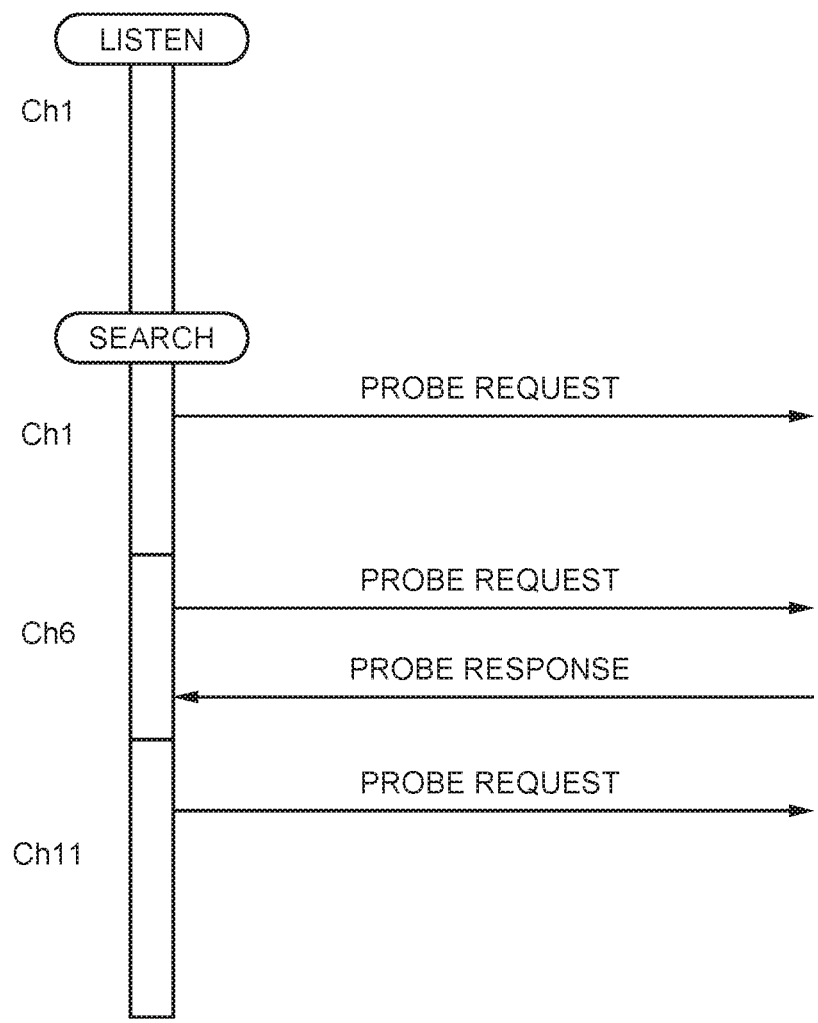
FIG. 5 is a conceptual diagram showing another example of the situation in which the other communication terminal is found in the discovery process by the communication terminal according to the first exemplary embodiment of the present invention.

Upon finding another communication terminal in the discovery process, the control part 102 determines whether or not to connect the communication terminal 100 to the other communication terminal found, on the basis of information of the other communication terminal (step S102). For example, as schematically shown in FIG. 4, in the listen state, the control part 102 finds another communication terminal by receiving a probe request from the other communication terminal, uses the MAC address of the other communication terminal contained in the received probe request to unicast a probe response to the other communication terminal, and thereafter determines whether or not to connect the communication terminal 100 to the other communication terminal while continuing the discovery process. Further, as schematically shown in FIG. 5, in the search state, the control part 102 finds another communication terminal by receiving a probe response from the other communication terminal in response to a probe request transmitted by using the communication channel ch6, for example, and determines whether or not to connect the communication terminal 100 to the other communication terminal while continuing the discovery process.

In the case of determining not to connect to the other communication terminal found (NO at step S103), the control part 102 does not execute a process to connect to the other communication terminal and waits another communication terminal to be found in the discovery process again. On the other hand, in the case of determining to connect to the other communication terminal found, the control part 102 determines whether the communication terminal 100 or the other communication terminal transmits a connection request (step S104). Then, in a case where the communication terminal 100 does not transmit a connection request (NO at step S105), the control part 102 goes to step S106. On the contrary, in a case where the communication terminal 100 transmits a connection request (YES at step S105), the control part 102 process goes to step S107.

At step S106, the control part 102 stops the discovery process and waits for reception of a connection request from the other communication terminal by using a given communication channel. Then, upon receiving a connection request from the other communication terminal through the given communication channel, the control part 102 transmits a response to the connection request to the other communication terminal through the given communication channel and goes to step S108. For example, when receiving GO Negotiation Request as a connection request from the other communication terminal, the control part 102 transmits GO Negotiation Response as a response and goes to step S108. When receiving Invitation Request as a connection request from the other communication terminal, the control part 102 transmits Invitation Response as a response and goes to step S108.

On the other hand, at step S107, the control part 102 stops the discovery process and transmits a connection request to the other communication terminal by using a given communication channel, and goes step S108. For example, the control part 102 transmits GO Negotiation Request as a connection request and, when receiving GO Negotiation Response from the other communication terminal, goes to step S108.

At step S108, the control part 102 exchanges necessary information for the rest of the connection process between the communication terminal 100 and the other communication terminal having exchanged the communication request and the response thereto. Exchange of necessary information for the rest of the connection process conforms to the Wi-Fi Direct specification. For example, when exchange of GO Negotiation Request and GO Negotiation Response is performed between the communication terminal 100 and the other communication terminal, transmission and reception of GO Confirmation is performed, whereby either the communication terminal 100 or the other communication terminal is determined as a group owner, and subsequently, a WPS Provisioning Phase 1 process that Registrar (Group Owner) generates Credential (authentication information) and issues it to Enrollee (Client), and a WPS Provisioning Phase 2 process that Client reconnects to GO by using the new authentication information are executed. When exchange of Invitation Request and Invitation Response is performed between the communication terminal 100 and the other communication terminal, the WPS Provisioning Phase 1 process and the WPS Provisioning Phase 2 process are executed. Meanwhile, in a case where the other communication terminal is a communication terminal which can host the persistent group of the communication terminal 100, the WPS Provisioning Phase 1 process is omitted.

Thus, according to this exemplary embodiment, it is possible to quickly transmit or receive a connection request to or from another communication terminal found in the discovery process, and consequently, it becomes possible to initiate the connection process early. This is because the communication terminal 100: determines on the basis of information of another communication terminal found in the discovery process whether or not to connect the communication terminal itself to the other communication terminal and, in the case of connecting, which of the communication terminals transmits a connection request; stops the discovery process in the case of connecting to the other communication terminal and not transmitting a connection request; and waiting for reception of a connection request from the other communication terminal by using a given communication terminal.

Figure 6:
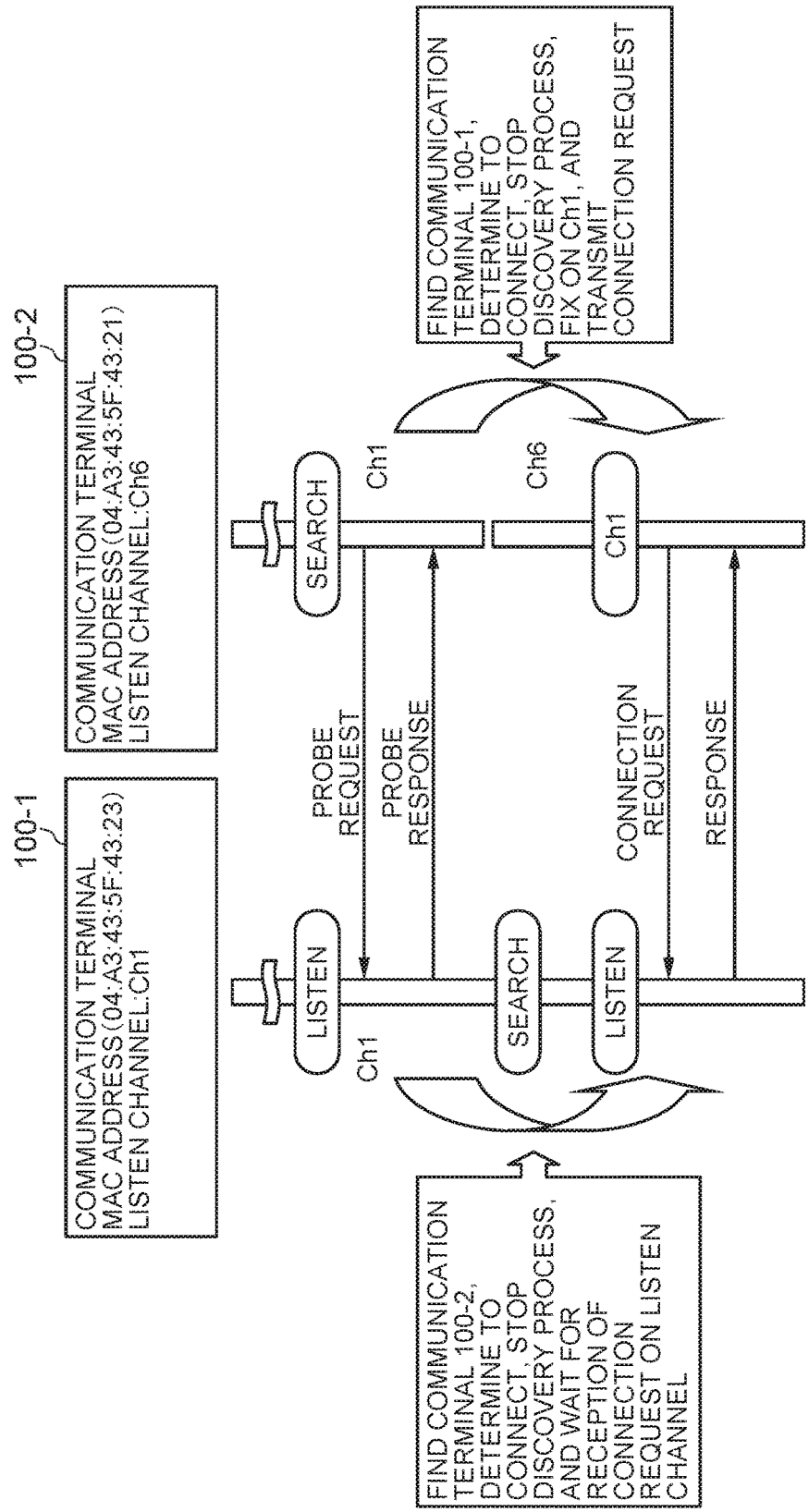
FIG. 6 is a diagram schematically showing a sequence that two communication terminals find each other in the discovery process and transmit and receive a connection request in the first exemplary embodiment of the present invention.

FIG. 6 is a schematic diagram describing an effect of this exemplary embodiment, schematically showing a sequence in which two communication terminals 100-1 and 100-2 unconnected to a communication network find each other in the discovery process and perform transmission and reception of a connection request. To be specific, the communication terminal 100-2 transmits a probe request in the search state using the communication channel ch1, the communication terminal 100-1 receives the probe request in the listen state using the communication channel ch1 and transmits a probe response, and the communication terminal 100-2 receives the probe response, whereby the communication terminals find each other.

Further, in the example shown in FIG. 6, a condition for determining to connect to another communication terminal is that the first 32-bit value of the MAC address of the other communication terminal is (04:A3:43:5F), a condition for determining which of the communication terminals transmits a connection request is that a communication terminal with a MAC address of smaller value transmits, and a rule for determining a given communication channel on which a connection request is transmitted and received is that the given communication channel is the listen channel of the connection request receiver. Accordingly, the communication terminal 100-1 determines to connect to the communication terminal 100-2 because the first 32-bit value of a MAC address (04:A3:43:5F:43:21) of the communication terminal 100-2 contained in the probe request coincides with a given value. Further, the communication terminal 100-1 determines not to transmit a connection request because a MAC address (04:A3:43:5F:43:23) of the communication terminal 100-1 itself is larger than the MAC address of the communication terminal 100-2. Then, the communication terminal 100-1 stops the discovery process, and waits for reception of a connection request on the communication channel ch1 fixed as the listen channel of the communication device 100-1. On the other hand, the communication terminal 100-2 determines to connect to the communication terminal 100-1 because the first 32-bit value of the MAC address of the communication terminal 100-1 contained in the received probe response coincides with the given value. Further, the communication terminal 100-2 determines to transmit a connection request because the MAC address of the communication terminal 100-2 is smaller than the MAC address of the communication terminal 100-1. Then, the communication terminal 100-2 stops the discovery process, and transmits a connection request to the communication device 100-1 on the communication channel ch1 fixed as the listen channel of the communication device 100-1. Because the communication device 100-1 waits for reception of a connection request on the fixed communication channel ch1 as mentioned above, the connection request transmitted by the communication device 100-2 is quickly received by the communication device 100-1, and a response to the connection request is transmitted to the communication device 100-2 by the communication device 100-1.

Figure 7:
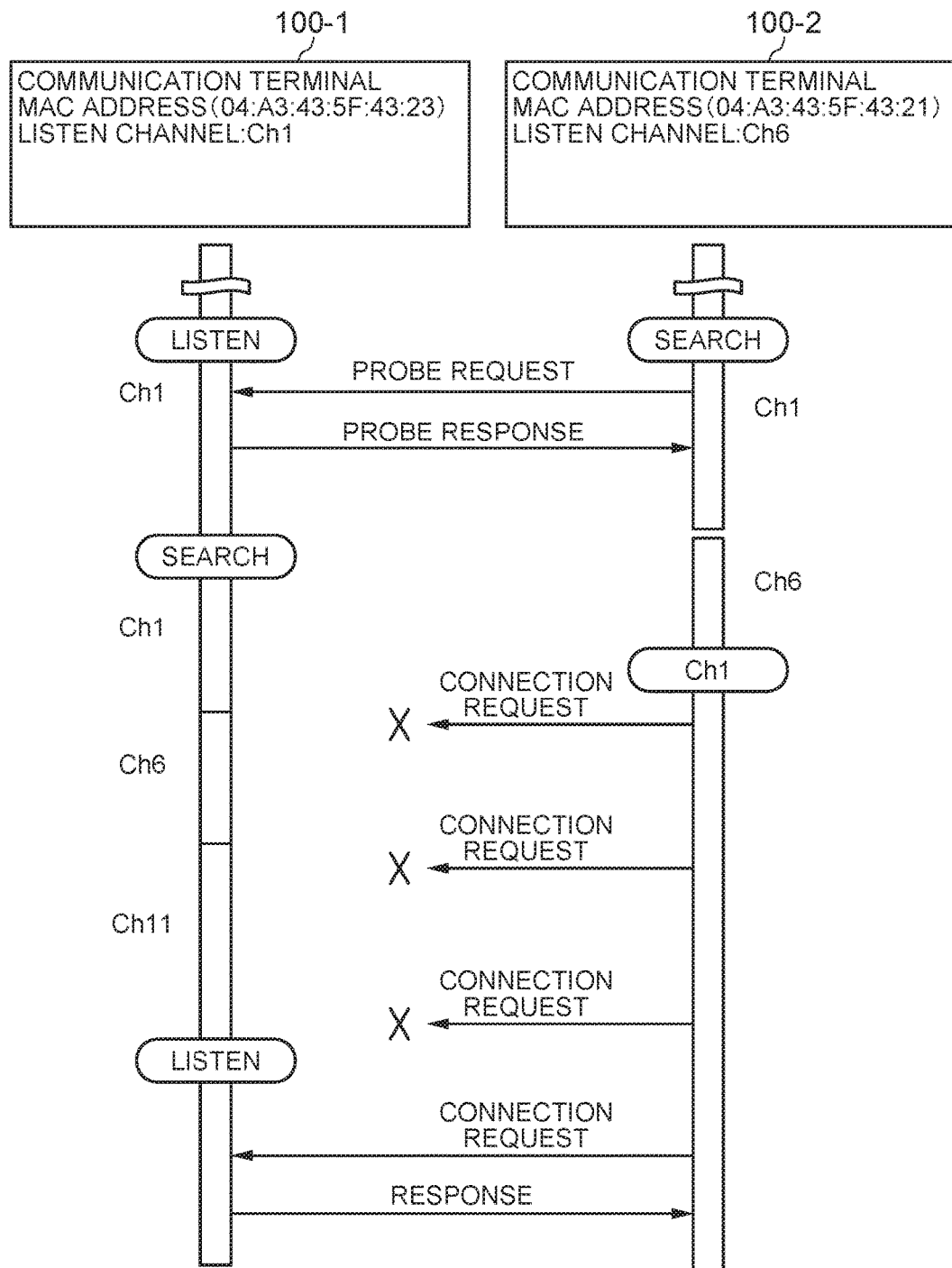
FIG. 7 is a diagram schematically showing a sequence in a case where one of the two communication terminals found each other in the discovery process continues the discovery process.

FIG. 7 schematically shows another sequence in which the two communication terminals 100-1 and 100-2 unconnected to a communication network find each other in the discovery process and perform transmission and reception of a connection request. Unlike in FIG. 6, FIG. 7 shows that the communication terminal 100-1 continues to execute the discovery process. As a result, the connection request transmitted by the communication terminal 100-2 is not received by the communication terminal 100-1 until the communication terminal 100-1 switches to the listen state, and the connection request is retransmitted several times.

Figure 8:
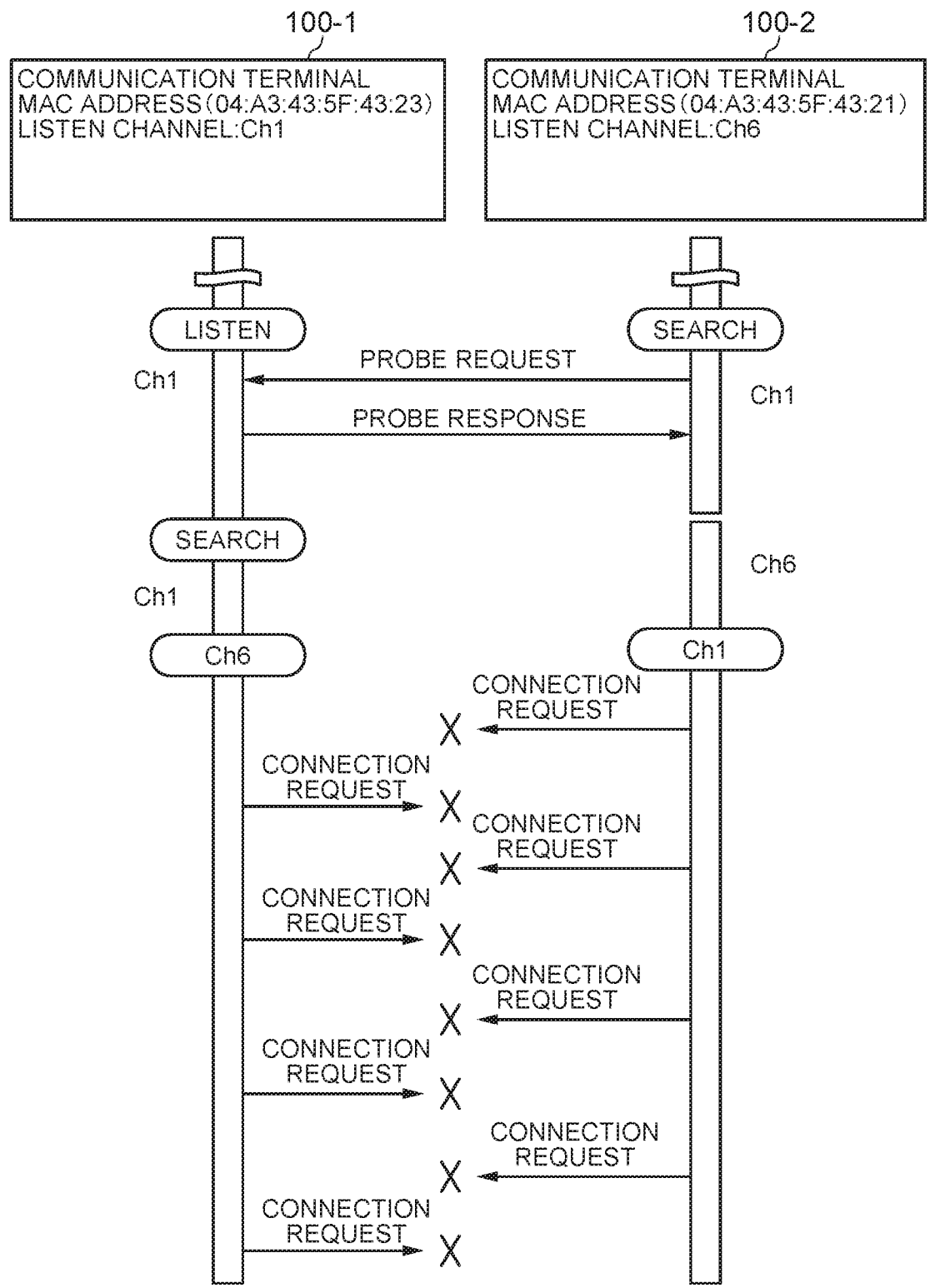
FIG. 8 is a diagram schematically showing a sequence in a case where both the two communication terminals found each other in the discovery process transmit connection requests.

FIG. 8 schematically shows another sequence in which the two communication terminals 100-1 and 100-2 unconnected to a communication network find each other in the discovery process and perform transmission and reception of a connection request. Unlike in FIG. 6, FIG. 8 shows that it is not determined which of the communication terminals transmits a connection request and the communication terminals 100-1 and 100-2 each transmit a connection request by using the listen channel of the other communication terminal when determining to connect to the other communication terminal. As a result, the communication terminal 100-1 transmits a connection request on the channel ch6, which is the listen channel of the communication terminal 100-2, whereas the communication terminal 100-2 transmits a connection request on the channel ch1, which is the listen channel of the communication terminal 100-1, with the result that a connection request can never be received.

Second Exemplary Embodiment

Figure 9:
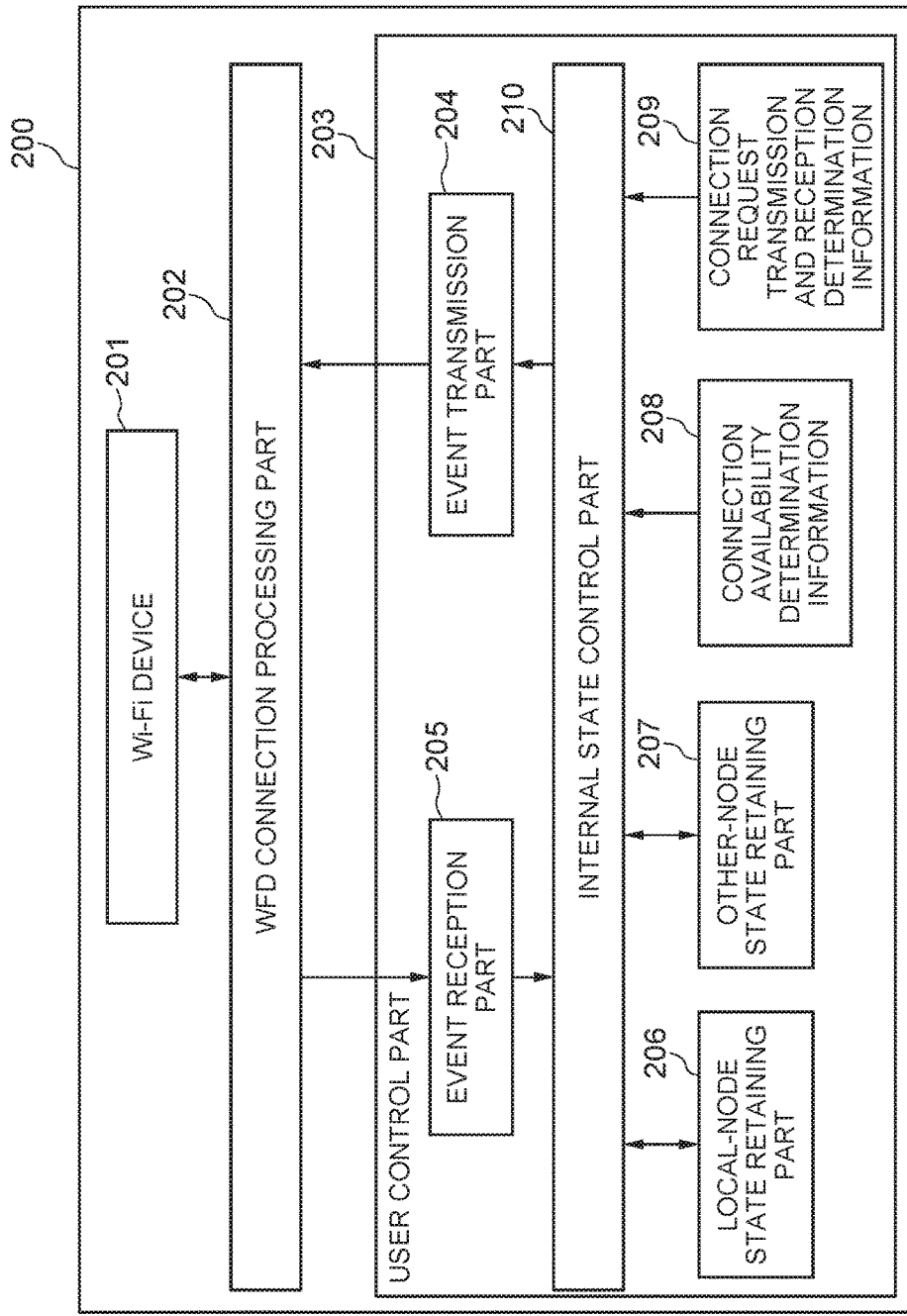
FIG. 9 is a block diagram of a communication terminal according to a second exemplary embodiment of the present invention.

In this exemplary embodiment, the details of a software structure of a communication terminal relating to the present invention will be chiefly described. Referring to FIG. 9, a communication terminal 200 according to a second exemplary embodiment of the present invention has a Wi-Fi device 201, a WFD connection processing part 202 and a User control part 203.

The Wi-Fi device 201 is the device driver of a wireless LAN. The Wi-Fi device 201 is installed in the hardware of a wireless LAN which is not shown in the drawings. When contrasted with FIG. 1, the Wi-Fi device 201 corresponds to the wireless communication part 101.

The WFD connection processing part 202 executes Wi-Fi device control for Wi-Fi Direct connection. The User control part 203 is a block which controls the WFD connection processing part 202 and realizes automatic connection using the Wi-Fi Direct. The WFD connection control part 202 and the User control part 203 are installed in a MPU which is not shown in the drawings. When contrasted with FIG. 1, the WFD connection processing part 202 and the User control part 203 correspond to the control part 102 and the storage part 103. The WFD connection processing part 202 has functions as described below.

First, the WFD connection processing part 202 has a function of executing a discovery process when receiving a search request from the User control part 203. In the discovery process, the WFD connection processing part 202 alternately repeats a search state and a listen state and, in the search state, sequentially switches a plurality of communication channels to transmit a probe request on each of the communication channels and receive a probe response. In the listen state, the WFD connection processing part 202 uses any one of the plurality of communication channels as a listen channel to receive a probe request and transmit a probe response. Then, the WFD connection processing part 202 transmits a search result including information of another communication terminal found in the discovery process to the User control part 203.

Also, the WFD connection processing part 202 has a function of, when receiving a listen request from the User control part 203, stopping the discovery process and waiting for reception of a connection request from another communication terminal by using a given communication channel. Then, when receiving a connection request from another communication terminal, the WFD connection processing part 202 transmits it to the User control part 203.

Further, the WFD connection processing part 202 has a function of, when receiving a request for transmission of a request for connection to another communication terminal from the User control part 203, stopping the discovery process and transmitting a connection request to another communication channel by using a given communication channel. Then, when receiving a response to the connection request from the other communication terminal, the WFD connection processing part 202 transmits it to the User control part 203.

The User control part 203 is a block which realizes automatic connection using the Wi-Fi Direct and has functions as described below.

First, the User control part 203 has a function of, when receiving a search result from the WFD connection processing part 202, determining on the basis of information of another communication terminal included in the search result whether to connect the communication terminal 200 to the other communication terminal and, in the case of connecting, which of the communication terminals transmits a connection request.

Also, the User control part 203 has a function of, when determining to connect to the other communication terminal and not to transmit a connection request from the communication terminal 200, transmitting a listen request to the WFD connection control part 202. Then, the User control part 203 has a function of, when receiving a connection request by the other communication terminal from the WFD connection processing part, requesting the WFD connection processing part 202 to transmit a response to the connection request and performing subsequent connection procedures.

Further, the User control part 203 has a function of, when determining to connect to the other communication terminal and transmitting a connection request from the communication terminal 200, requesting the WFD connection processing part 202 to transmit a connection request to the other communication terminal. Then, the User control part 203 has a function of, when the WFD connection processing part 202 transmits a connection request to the other communication terminal and receives a response thereto, performing subsequent connection procedures.

In order to realize the abovementioned functions, the User control part 203 has an event transmission part 204 and an event reception part 205 which connect to the WFD connection processing part 202 to transmit and receive information, a local-node state retaining part 206 which retains the state of the local node (the communication terminal 200), an other-node state retaining part 207 which retains a list of the MAC addresses and states of other nodes (other communication terminals), connection availability determination information 208 for determining availability of connection to another node, connection request transmission and reception determination information 209 for determining the transmitter and receiver of a connection request, and an internal state control part 210.

In the local-node state retaining part 206, one of IDLE (no connection), DISC (node found), CONN (connected), CLI (connected as client) and GO (connected as group owner) and P_GRP (information showing a state in which a persistent group can be hosted) are stored as the state of the local node. The information showing a state in which a persistent group can be hosted has 1 or 0, and an identifier for uniquely identifying a persistent group.

In the other-node state retaining part 207, one of LOST (not connected yet), FOUND (connected as a client) and GROUP (connected as a group owner) and P_GRP (information showing a state in which a persistent group can be hosted) are stored as the state of another node.

In the connection availability determination information 208, the value of first N bits of a MAC address is stored, for example. Meanwhile, the connection availability determination information is not limited to such information, and may be a list of the MAC addresses of other communication terminals connectable, for example.

In the connection request transmission and reception determination information 209, for example, a rule that defines a communication terminal with a MAC address of smaller value as the transmitter of a connection request is stored. Meanwhile, the connection request transmission and reception determination information is not limited to such a rule and may be a rule that defines a communication terminal with a MAC address of larger value as the transmitter of a connection request, or a rule that determines the transmitter and receiver of a connection request by using a value other than a MAC address. Moreover, in the case of fixedly using one rule, by installing the logic of the rule into the internal state control part 210, it is possible to omit the connection request transmission and reception determination information 209.

The internal state control part 210 forms a group with an adjacent node compliant with the Wi-Fi Direct by selecting and generating a proper command on the basis of an event type received from the WFD connection processing part 202 through the event reception part 205, the state of the local node stored in the local-node state retaining part 206 and the states of other nodes stored in the other-node state retaining part 207.

Figure 10:
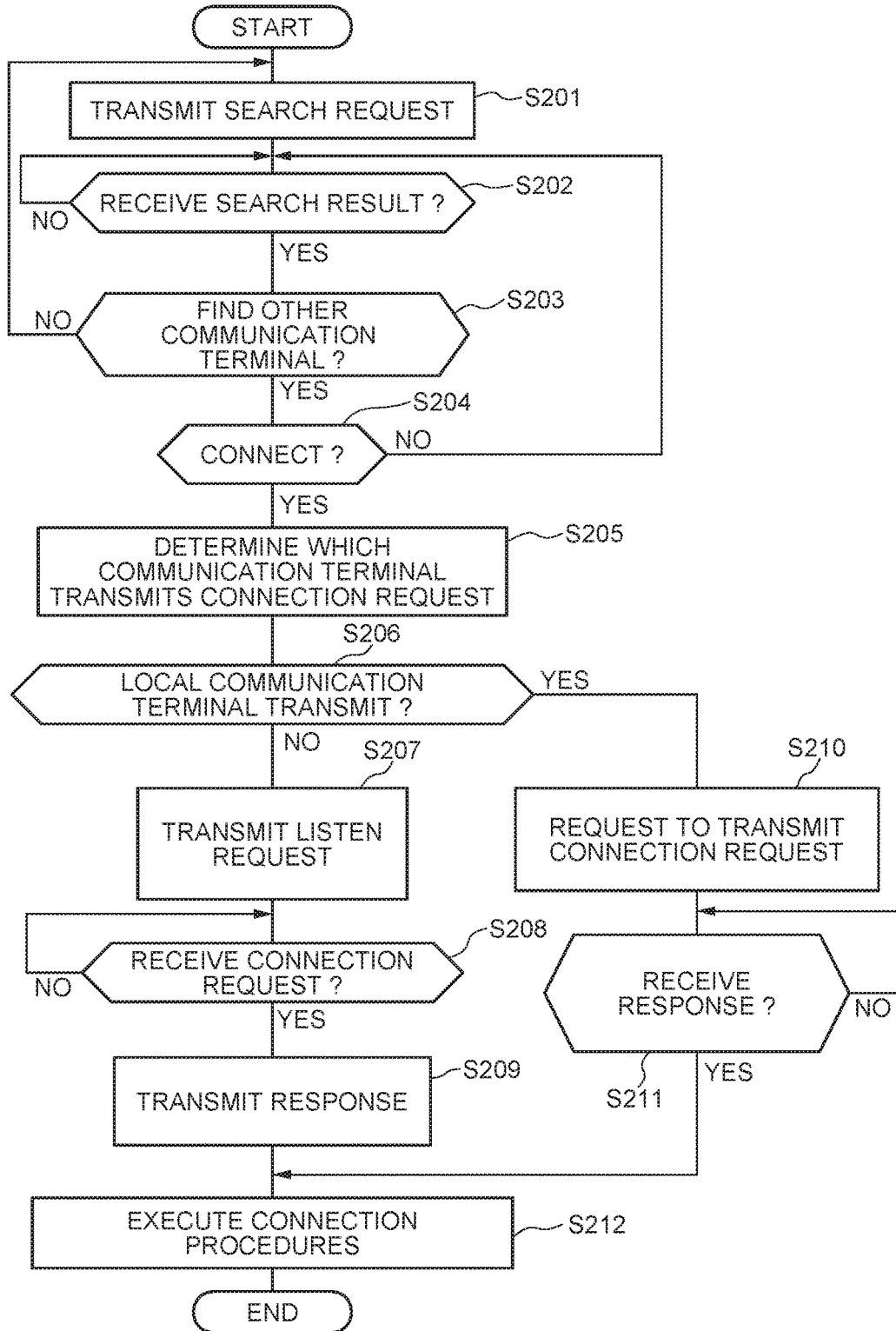
FIG. 10 is a flowchart showing an example of a process by a User control part of the communication terminal according to the second exemplary embodiment of the present invention.
Figure 11:
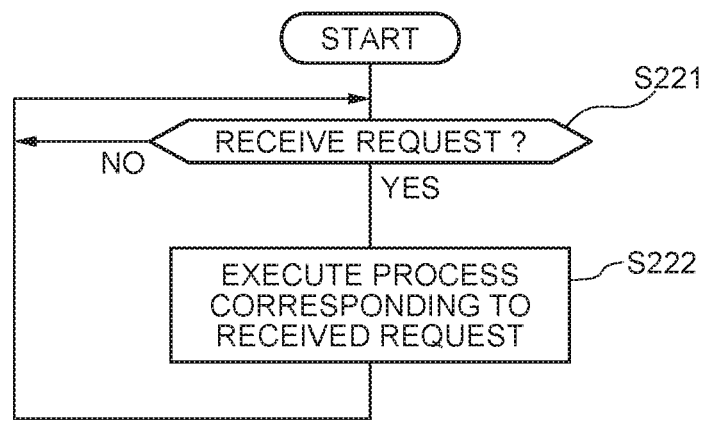
FIG. 11 is a flowchart showing an example of a process by a WFD connection processing part of the communication terminal according to the second exemplary embodiment of the present invention.

FIG. 10 is a flowchart showing an example of a process by the User control part 203, and FIG. 11 is a flowchart showing an example of a process by the WFD connection processing part 202. Below, the operation of the communication terminal 200 according to this exemplary embodiment will be described referring to FIGS. 9 to 11.

When the communication terminal 200 is started with power-on or the like, the internal state control part 210 of the User control part 203 transmits a search request to the WFD connection processing part 202 via the event transmission part 204 (step S201). The WFD connection processing part 202 is configured to, when receiving a request from the User control part 203 (YES at step S221), execute a process corresponding to the request (step S222). Therefore, when receiving a search request, the WFD connection processing part 202 executes a discovery process. The discovery process is executed in conformity to Device Discovery Procedure of the Wi-Fi Direct specification. Every time finding another communication terminal in the discovery process, the WFD connection processing part 202 transmits a search result including information of the other communication terminal found to the User control part 203. In a case where a given time elapses without finding another communication terminal, the WFD connection processing part 202 stops the discovery process and transmits a search result showing it to the User control part 203.

When receiving the search result from the WFD connection processing part 202 via the event reception part 205 (step S202), the internal state control part 210 of the User control part analyzes the search result and determines whether or not another communication terminal is found (step S203). In a case where another communication terminal is not found, the internal state control part 210 transmits a search request to the WFD connection processing part 202 again to keep executing the discovery process (step S201).

In a case where another communication terminal is found, the internal state control part 210 checks whether or not the value of first N bits of a MAC address of the other communication terminal contained in the search result is a given value retained in the connection availability determination information 208, thereby determining whether or not to connect to the other communication terminal (step S204). Then, in the case of determining not to connect because the value of the first N bits of the MAC address of the other communication terminal is not the given value, the internal state control part 210 discards the current search result, and waits for a new search result to be sent from the WFD connection processing part 202 (step S202).

On the other hand, in the case of determining to connect because the value of the first N bits of the MAC address of the other communication terminal coincides with the given value, the internal state control part 210 determines whether the communication terminal 200 or the other communication terminal transmits a connection request, in accordance with the rule retained in the connection request transmission and reception determination information 209 (step S205). To be specific, the internal state control part 210 compares the MAC address of the communication terminal 200 with the MAC address of the other communication terminal, and determines the communication terminal 200 as the transmitter of a connection request when the value of the MAC address of the communication terminal 200 is smaller than the value of the MAC address of the other communication terminal, whereas determines the other communication terminal as the transmitter of a connection request otherwise.

Next, in a case where the communication terminal 200 is not the transmitter of a connection request (NO at step S206), the internal state control part 210 transmits a listen request to the WFD connection processing part 202 through the event transmission part 204 (step S207). When receiving the listen request from the User control part 203 (step S221), the WFD connection processing part 202 stops the discovery process, sets to a listen channel used in the listen state of the discovery process, and waits for receiving a connection request from the other communication terminal (step S222). Then, when receiving a connection request from the other communication terminal through the listen channel, the WFD connection processing part 202 transmits the received connection request to the User control part 203 (step S222). When receiving the connection request (step S208), the internal state control part 210 transmits a request for transmission of a response to the connection request, to the WFD connection processing part 202 (step S209). In accordance with this, the WFD connection processing part 202 transmits the response to the connection request, to the other communication terminal through the listen channel (step S221, step S222). After that, the internal state control part 210 goes to step S212 to execute the rest of the connection procedures.

On the other hand, in a case where the communication terminal 200 is the transmitter of a connection request (YES at step S206), the internal state control part 210 requests the WFD connection processing part 202 to transmit a connection request through the event reception part 204 (step S210). When requested to transmit a connection request by the User control part 203 (step S221), the WFD connection processing part 202 stops the discovery process, sets to a listen channel of the communication terminal of a connection request transmission destination, and transmits a connection request from the communication terminal 200 (step S222). Then, when receiving a response to the connection request from the other communication terminal through the listen channel, the WFD connection processing part 202 transmits the received response to the User control part 203 (step S222). When receiving the response to the connection request (step S211), the internal state control part 210 goes to step S212 to execute the rest of the connection procedures.

Thus, according to this exemplary embodiment, it is possible to quickly transmit or receive a connection request to or from another communication terminal found in the discovery process, and consequently, it becomes possible to initiate the connection process early. This is because the User control part 203 of the communication terminal 200 controls to: determine on the basis of information of another communication terminal found in the discovery process whether or not to connect the communication terminal 200 to the other communication terminal and, in the case of connecting, which of the communication terminals transmits a connection request; and in a case where the communication terminal 200 connects to the other communication terminal and does not transmit a connection request, stop the discovery process by the WFD connection processing part 202 and wait for reception of a connection request from the other communication terminal by using a given communication channel.

Figure 12:
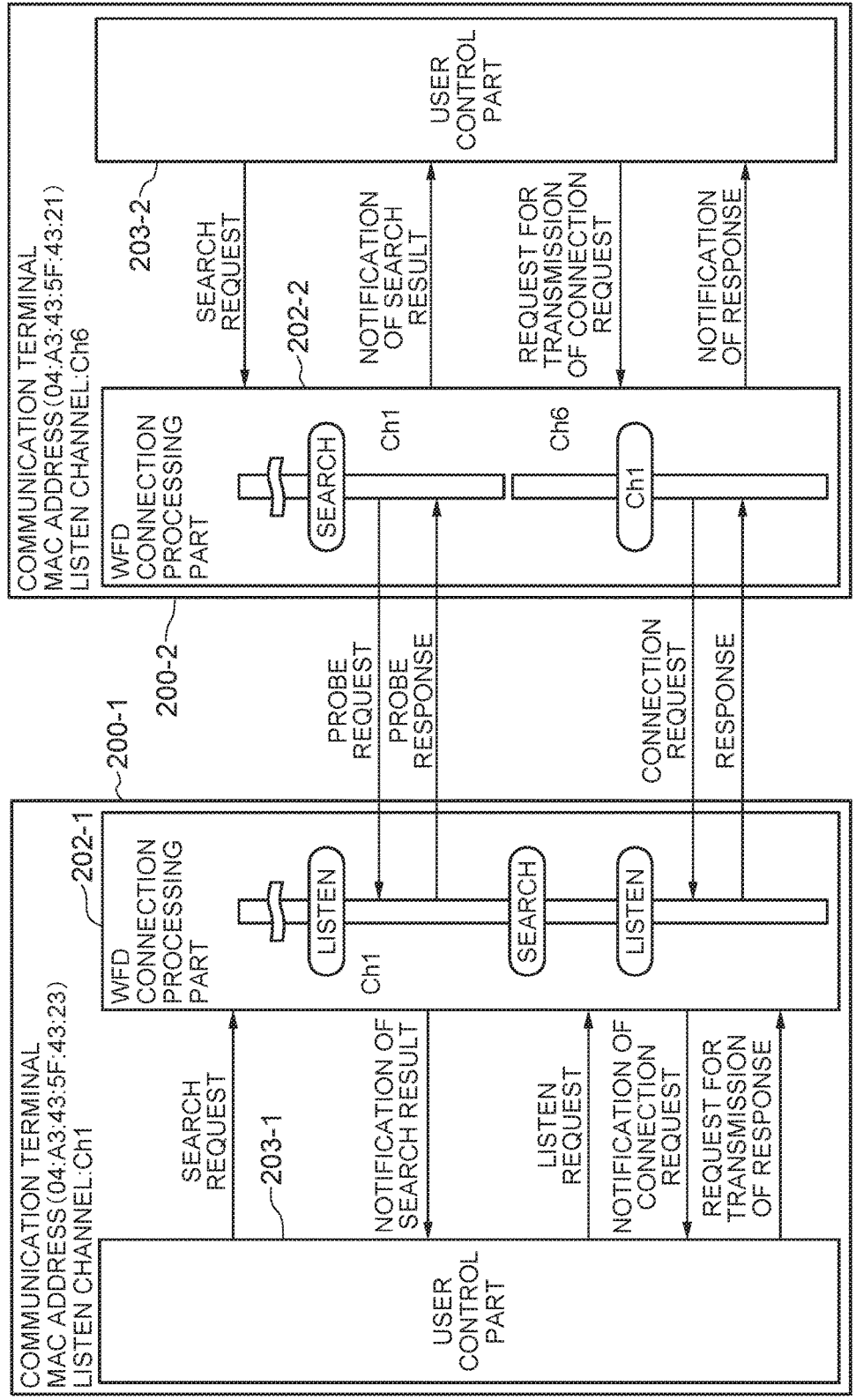
FIG. 12 is a diagram schematically showing a sequence that two communication terminals find each other in the discovery process and transmit and receive a connection request in the second exemplary embodiment of the present invention.

FIG. 12 is a schematic diagram describing an effect of this exemplary embodiment, schematically showing a sequence in which two communication terminals 200-1 and 200-2 unconnected to a communication network find each other in the discovery process and transmit and receive a connection request.

The WFD connection processing part 202-1 of the communication terminal 200-1 receives a search request from the User control part 203-1 and thereby initiates the discovery process. The WFD connection processing part 202-2 of the communication terminal 200-2 receives a search request from the User control part 203-2 and thereby initiates the discovery process. The communication terminal 200-2 transmits a probe request in the search state using the communication channel ch1, the communication terminal 200-1 receives the probe request in the listen state using the communication channel ch1 and transmits a probe response, and the communication terminal 200-2 receives the probe response. The WFD connection processing part 202-1 of the communication terminal 200-1 gives the User control part 203-1 a search result including the probe request received from the communication terminal 200-2. The WFD connection processing part 202-2 of the communication terminal 200-2 gives the User control part 203-2 a search result including the probe request received from the communication terminal 200-1.

In the example shown in FIG. 12, a condition for determining to connect to another communication terminal is that the value of first 32 bits of a MAC address of the other communication terminal is (04:A3:43:5F), a condition for determining which of the communication terminals transmits a connection request is that the value of the MAC address is smaller, and a rule for determining a given communication channel on which a connection request is transmitted and received is a listen channel of a connection request receiver. Accordingly, the User control part 203-1 of the communication terminal 200-1 determines to connect to the communication terminal 200-2 because the value of the first 32 bits of the MAC address (04:A3:43:5F:43:21) of the communication terminal 200-2 contained in the probe request coincides with a given value. Further, because the MAC address (04:A3:43:5F:43:23) of the communication terminal 200-1 is larger than the MAC address of the communication terminal 200-2, the User control part 203-1 determines not to transmit a connection request and transmits a listen request to the WFD connection processing part 202-1. Consequently, the WFD connection processing part 202-1 stops the discovery process, sets to the communication channel ch1, which is the listen channel of the communication device 200-1, and waits for reception of a connection request. On the other hand, the User control part 203-2 of the communication terminal 200-2 determines to connect to the communication terminal 200-1 because the value of first 32 bits of the MAC address of the communication terminal 200-1 contained in the received probe response coincides with the given value. Further, because the MAC address of the communication terminal 200-2 is smaller than the MAC address of the communication terminal 200-1, the User control part 203-2 determines to transmit a connection request and requests the WFD connection processing part 202-2 to transmit a connection request. Consequently, the WFD connection processing part 202-2 stops the discovery process, sets to the communication channel ch1, which is the listen channel of the communication device 200-1, and transmits a connection request to the communication device 200-1. Because the communication device 200-1 sets to the communication channel ch1 and waits for reception of a connection request, the connection request transmitted by the communication device 200-2 is quickly received by the communication device 200-1, and subsequently, a response to the connection request is transmitted to the communication device 200-2 by the communication device 200-1.

Third Exemplary Embodiment

Figure 13:
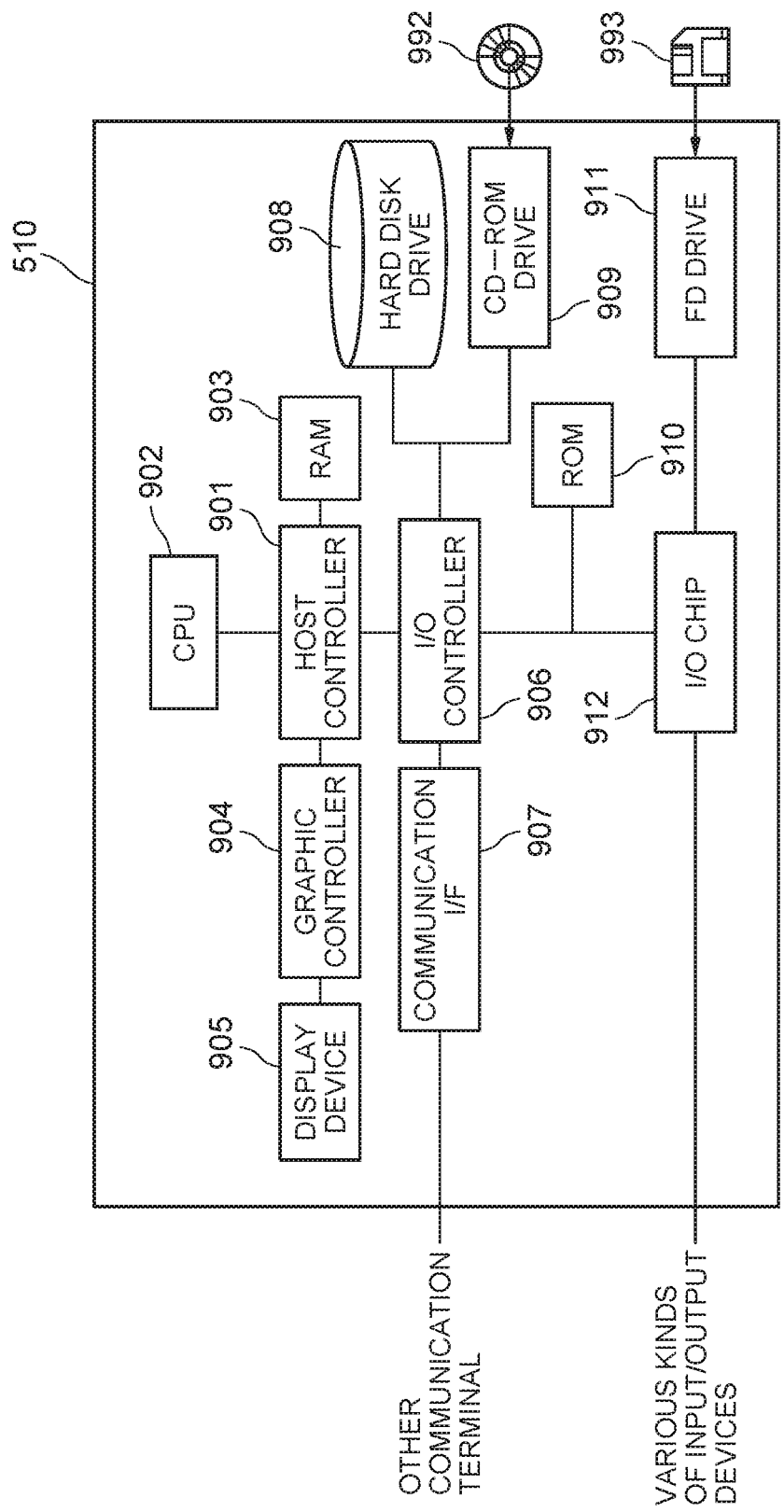
FIG. 13 is a block diagram showing an example of a hardware configuration in a case where a communication terminal of the present invention is configured with an electronic information processing device such as a computer.

FIG. 13 shows an example of a hardware configuration in a case where the communication terminal in each of the exemplary embodiments described above is configured with an electronic information processing device such as a computer. A communication terminal 510 in this example has a CPU (Central Processing unit) periphery, an input/output part, and a legacy input/output part. The CPU periphery has a CPU 902, a RAM 903, a graphic controller 904 and a display device 905 which are connected to each other by a host controller 901. The input/output part has a communication interface (I/F) 907, a hard disk drive 908 and a CD-ROM (Compact Disk Read Only Memory) drive 909 which are connected to the host controller 901 by an input/output (I/O) controller 906. The legacy input/output part has a ROM (Read Only memory) 910, a flexible disk (FD) drive 911 and an input/output (I/O) chip 912 which are connected to the input/output controller 906.

The host controller 901 connects the RAM 903 to the CPU 902 accessing the RAM 903 at a high transfer rate and to the graphic controller 904. The CPU 902 operates on the basis of programs stored in the ROM 910 and the RAM 903, and controls the respective parts. The graphic controller 904 acquires image data which the CPU 902 and the like generates on a frame buffer installed in the RAM 903, and displays on the display device 905. Instead, the graphic controller 904 may include a frame buffer which stores image data generated by the CPU 902 and the like.

The input/output controller 906 connects the host controller 901 to the hard disk drive 908 serving as a relatively high-speed input/output device, the communication interface 907, and the CD-ROM drive 909. The hard disk drive 908 stores a program used by the CPU 902 and data. The communication interface 907 connects to another communication terminal to transmit or receive a program or data. The CD-ROM drive 909 reads a program or data from a CD-ROM 992, and provides the hard disk drive 908 and the communication interface 907 with the program or the data via the RAM 903.

To the input/output controller 906, the ROM 910 and relatively low-speed input/output devices such as the flexible disk drive 911 and the input/output chip 912 are connected. The ROM 910 stores a boot program which the communication terminal 510 executes when starting, a program which depends on the hardware of the communication terminal 510, and the like. The flexible drive 911 retrieves a program or data from a flexible disk 993, and provides the hard disk drive 908 and the communication interface 907 with the program or the data via the RAM 903. The input/output chip 912 connects the flexible disk drive 911, or various kinds of input/output devices via a parallel port, a serial port, a keyboard port, a mouse port and the like.

A program to be executed by the CPU 902 is stored in a recording medium such as the flexible disk 993, the CD-ROM 992 and an IC (Integrated Circuit) card and provided by the user. The program stored in the recording medium may be compressed or uncompressed. The program is installed from the recording medium into the hard disk drive 908, read into the RAM 903 and executed by the CPU 902. The program executed by the CPU 902 causes the communication terminal 510 to function as a wireless communication part, a control part, a storage part, a User control part, a WFD connection processing part, a Wi-Fi device, and so on in each of the exemplary embodiments described before.

The program shown above may be stored in an external storage medium. As the storage medium, not only the flexible disk 993 and the CD-ROM 992, but also an optical recording medium such as a DVD (Digital Versatile Disk) and a PD (Phase Disk), a magneto-optical recording medium such as a MD (MiniDisk), a tape medium, a semiconductor memory such as an IC card, and the like can be used. Moreover, it is possible to use, as a recording medium, a storage medium such as a hard disk and a RAM installed in a server system connected to a dedicated communication network or the Internet, and provide an information sharing system using a program via the network.

Other Exemplary Embodiments

Although the present invention is described with the several exemplary embodiments, the present invention is not limited to only the exemplary embodiments described above, and can be changed and modified in various manners.

The present invention is based upon and claims the benefit of priority from Japanese patent application No. 2013-268597, filed on Dec. 26, 2013, the disclosure of which is incorporated herein in its entirety by reference.

INDUSTRIAL APPLICABILITY

The present invention can be applied to a method of automatically forming a communication network such as a communication network conforming to the Wi-Fi Direct specification.

DESCRIPTION OF REFERENCE NUMERALS 100 communication terminal
101 wireless communication part
102 control part
103 storage part
104 antenna

The invention claimed is:
1. A connection control method executed by a communication terminal, the connection control method comprising:
executing a discovery process including sequentially switching a plurality of communication channels and discovering another communication terminal existing around the communication terminal itself;
in a case of connecting to another communication terminal found in the discovery process, performing a determination of which of the communication terminals transmits a connection request, the connection request being a request for negotiation determining either the communication terminal itself or the other communication terminal as an access point; and
in a case where the communication terminal itself does not transmit the connection request, stopping the discovery process and waiting for reception of the connection request from the other communication terminal by using a given communication channel.

2. The connection control method by the communication terminal according to claim 1, wherein:
when the communication terminal itself transmits the connection request, the communication terminal itself stops the discovery process and transmits the connection request to the other communication terminal by using the given communication channel.

3. The connection control method by the communication terminal according to claim 2, wherein:
the connection request which the communication terminal transmits is a request for negotiation determining either the communication terminal itself or the other communication terminal as an access point.

4. The connection control method by the communication terminal according to claim 1, wherein:
the given communication channel is one communication channel determined in accordance with a predetermined rule among the plurality of communication channels.

5. The connection control method by the communication terminal according to claim 1, wherein:
in the discovery process: a search state and a listen state are alternately repeated; in the search state, the plurality of communication channels are sequentially switched and transmission of a probe request and reception of a probe response is performed on each of the communication channels; and in the listen state, one of the plurality of communication channels is used as a listen channel and reception of the probe request and transmission of the probe response is performed.

6. A communication terminal configuring a communication network, the communication terminal comprising:
a wireless communicator for using a plurality of communication channels and exchanging communication messages with another communication terminal; and
a controller connected to the wireless communication part, wherein the controller;
executes a discovery process including sequentially switching a plurality of communication channels and discovering another communication terminal existing around the communication terminal itself; in a case of connecting to another communication terminal found in the discovery process, performs a determination of which of the communication terminals transmits a connection request, the connection request being a request for negotiation determining either the communication terminal itself or the other communication terminal as an access point;

and in a case where the communication terminal itself does not transmit the connection request, stops the discovery process and waits for reception of the connection request from the other communication terminal by using a given communication channel.

7. The communication terminal according to claim 6, wherein when the communication terminal itself transmits the connection request, the controller stops the discovery process and transmits the connection request to the other communication terminal by using the given communication channel.

8. The communication terminal according to claim 7, wherein the connection request which the communication terminal transmits is a request for negotiation determining either the communication terminal itself or the other communication terminal as an access point.

9. The communication terminal according to claim 6, wherein the given communication channel is one communication channel determined in accordance with a predetermined rule among the plurality of communication channels.

10. The communication terminal according to claim 6, wherein in the discovery process, the controller: alternately repeats a search state and a listen state;
in the search state, sequentially switches the plurality of communication channels and performs transmission of a probe request and reception of a probe response on each of the communication channels; and in the listen state, uses one of the plurality of communication channels as a listen channel and performs reception of the probe request and transmission of the probe response.

11. A non-transitory computer-readable medium storing a program comprising instructions for causing a computer configuring a communication network to function as:
a wireless communicator using a plurality of communication channels and exchanging communication messages with another communication terminal; and
a controller connected to the wireless communication part, wherein:
the controller: executes a discovery process including sequentially switching a plurality of communication channels and discovering another communication terminal existing around the communication terminal itself; in a case of connecting to another communication terminal found in the discovery process, performs a determination of which of the communication terminals transmits a connection request, the connection request being a request for negotiation determining either the communication terminal itself or the other communication terminal as an access point; and in a case where the communication terminal itself does not transmit the connection request, stops the discovery process and waits for reception of the connection request from the other communication terminal by using a given communication channel.

12. The connection control method by the communication terminal according to claim 1, wherein:
in the determination which of the communication terminals transmits the connection request, it is determined which of the communication terminals transmits the connection request on a basis of information of the other communication terminal found in the discovery process.

13. The connection control method by the communication terminal according to claim 12, wherein:
in the determination which of the communication terminals transmits the connection request, it is determined which of the communication terminals transmits the connection request on a basis of a magnitude relation between a value of a MAC address of the communication terminal itself and a value of a MAC address of the other communication terminal.

14. The connection control method by the communication terminal according to claim 12, wherein:
in the determination which of the communication terminals transmits the connection request, it is determined which of the communication terminals transmits the connection request on a basis of a relation between a device name of the communication terminal itself and a device name of the other communication terminal.

15. The connection control method by the communication terminal according to claim 1, the connection control method comprising:
performing determination whether or not to connect the communication terminal itself to the other communication terminal on a basis of information of the other communication terminal found in the discovery process.

16. The connection control method by the communication terminal according to claim 15, wherein:
in the determination whether or not to connect the communication terminal itself to the other communication terminal, it is determined whether or not to connect the communication terminal itself to the other communication terminal on a basis of a MAC address of the other communication terminal.

17. The connection control method by the communication terminal according to claim 15, wherein:
in the determination whether or not to connect the communication terminal itself to the other communication terminal, it is determined whether or not to connect the communication terminal itself to the other communication terminal on a basis of a device name of the other communication terminal.

18. The communication terminal according to claim 6, wherein in the determination which of the communication terminals transmits the connection request, the controller determines which of the communication terminals transmits the connection request on a basis of information of the other communication terminal found in the discovery process.

19. The communication terminal according to claim 18, wherein in the determination which of the communication terminals transmits the connection request, the controller determines which of the communication terminals transmits the connection request on a basis of a magnitude relation between a value of a MAC address of the communication terminal itself and a value of a MAC address of the other communication terminal.

20. The communication terminal according to claim 18, wherein in the determination which of the communication terminals transmits the connection request, the controller determines which of the communication terminals transmits the connection request on a basis of a relation between a device name of the communication terminal itself and a device name of the other communication terminal.

21. The communication terminal according to claim 6, wherein the controller performs determination whether or not to connect the communication terminal itself to the other communication terminal on a basis of information of the other communication terminal found in the discovery process.

22. The communication terminal according to claim 21, wherein in the determination whether or not to connect the communication terminal itself to the other communication terminal, the controller determines whether or not to connect the communication terminal itself to the other communication terminal on a basis of a MAC address of the other communication terminal.

23. The communication terminal according to claim 21, wherein in the determination whether or not to connect the communication terminal itself to the other communication terminal, the controller determines whether or not to connect the communication terminal itself to the other communication terminal on a basis of a device name of the other communication terminal.

* * * * *